Aug. 4, 1970  H. BEHRENS  3,522,742

DIFFERENTIAL STEPPING MECHANISM

Filed Sept. 27, 1968  3 Sheets-Sheet 1

INVENTOR
HERBERT BEHRENS
BY Michael S. Striker
ATTORNEY

Aug. 4, 1970     H. BEHRENS     3,522,742
DIFFERENTIAL STEPPING MECHANISM
Filed Sept. 27, 1968     3 Sheets-Sheet 2
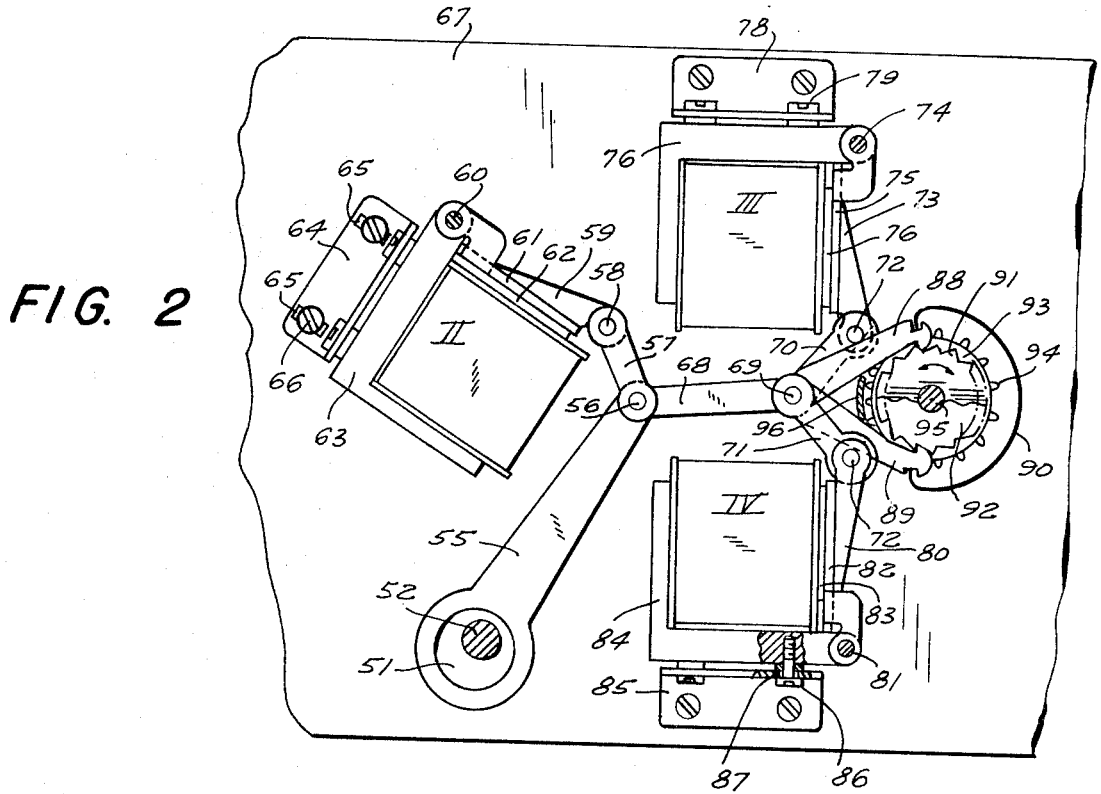
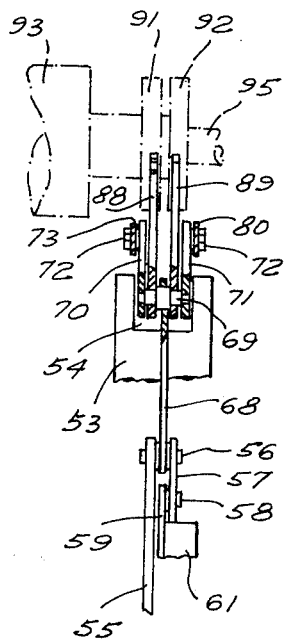
INVENTOR
HERBERT BEHRENS
BY
Michael S. Sterker
ATTORNEY

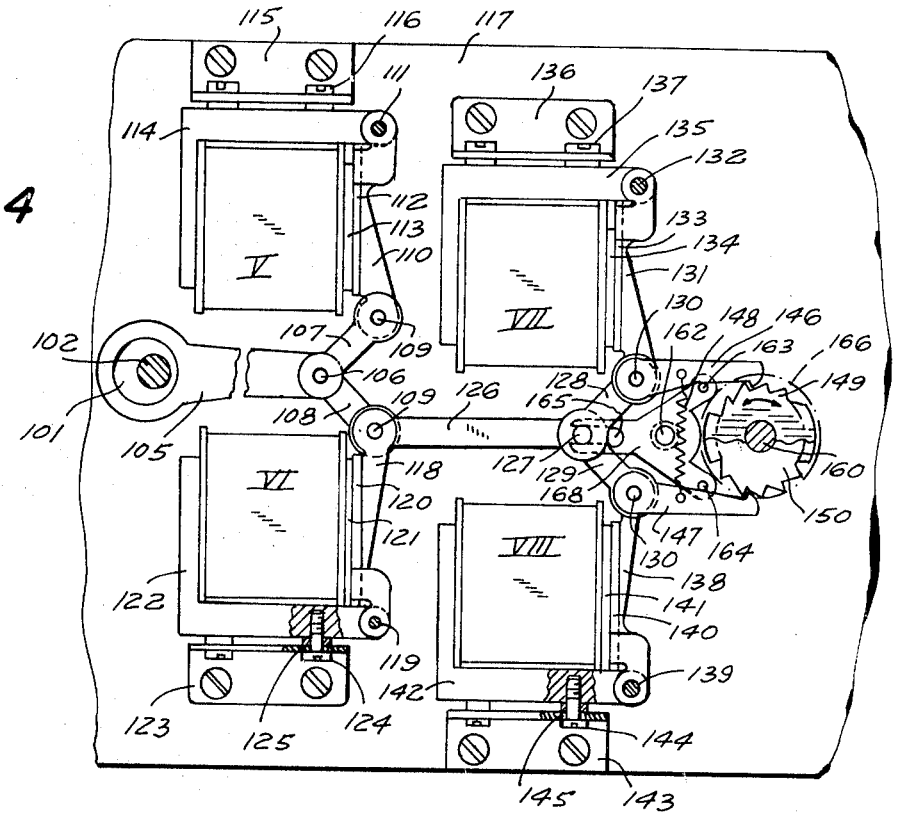
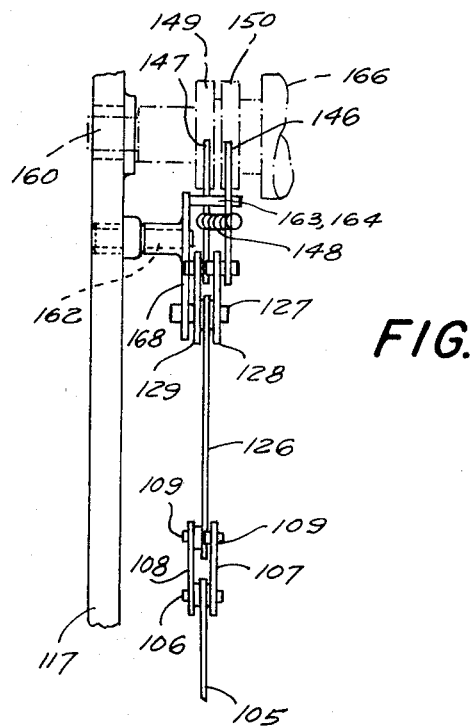
FIG. 4
FIG. 5

3,522,742
DIFFERENTIAL STEPPING MECHANISM
Herbert Behrens, Neuenburg, Germany, assignor to Olympia Werke AG, Wilhelmshaven, Germany
Filed Sept. 27, 1968, Ser. No. 763,310
Claims priority, application Germany, Oct. 7, 1967, 1,524,983
Int. Cl. F16h 21/26, 27/02
U.S. Cl. 74—142          22 Claims

ABSTRACT OF THE DISCLOSURE

A rotary driven means, such as a sprocket wheel for transporting a record carrier tape, is stepwise turned in forward and reverse directions by two drive members reciprocated by a differential toggle linkage system including a plurality of linkages which can be selectively arrested by electromagnets to cause idling of the linkage system and stopping of the driven means, or selective operation of the two drive members.

BACKGROUND OF THE INVENTION

The present invention relates to a differential stepping mechanism for transmitting a stepping motion from a continuously reciprocating or oscillating input means to a driven means, and being controllable for causing a stepping movement of the driven means in forward and rearward direction, and for momentary stopping, and again starting the movement of the driven element, which is preferably a means for transporting a record carrier tape. The driven means is selectively stepwise moved during one or several cycles, or not moved at all.

Apparatus according to the prior art serving the purpose of the invention, requires great masses to be accelerated and decelerated so that the transporting speed is limited. Furthermore, the apparatus of the prior art is subject to great wear.

Another disadvantage of the prior art construction is the considerable noise produced by the stepping operations, which cannot be avoided even during idling of the apparatus.

The switching of apparatus according to the prior art between the conditions "stop," "forward," and "reverse" is effected by electromagnets which require a very precise timing of the command pulses by which the electromagnets are selectively energized.

SUMMARY OF THE INVENTION

It is one object of the invention to overcome the disadvantages of the prior art, and to provide a differential stepping mechanism for stepwise driving a driven means at least in one direction, and for also stopping and starting the movement of driven means.

Another object of the invention is to provide a differential stepping mechanism whose input operates in a sinusoidal function, and which requires practically no part of the operating cycle for the control operations required for starting, stopping, and reversing the movement of the driven means.

Another object of the invention is to provide the apparatus with electromagnetic control means which do not serve for providing any part of the power for driving the mechanism.

With these objects in view, drive members by which the driven means are stepwise shifted, are pivotally connected with a differential linkage means, an input part of which is driven by a rotary eccentric, while an output part of which reciprocates the drive members, or a single drive member, or stops the same, depending on the arresting of a linkage part by control means, preferably controlled electromagnets.

A differential stepping mechanism according to one embodiment of the invention comprises input means including a reciprocable pivot means and being preferably driven by the eccentric; differential linkage means including first and second linkages; first and second control means cooperating with the first and second linkages for arresting a selected one of the same so that the respective other linkage oscillates; drive means connected with the first linkage and being reciprocated by the same when the second linkage is arrested and said first linkage oscillates; and driven means stepwise driven by the drive means when the second linkage is arrested.

Preferably, each linkage includes a toggle link mounted on the input pivot means, a control link connected with a toggle link by a connecting pivot, and a stationary pivot supporting the control link for angular movement. At least one control means includes an electromagnet which preferably cooperates with the control link of the respective linkage. The drive means preferably includes at least one pawl cooperating with a ratchet wheel for turning the driven means, and being mounted on a connecting pivot. If two driven pawls are provided for forward and reverse transport, they may be mounted on the connecting pivot of the two linkages, or on the input pivot means.

The differential stepping mechanism according to the invention is continuously driven by an input eccentric by which the input pivot means is reciprocated. Since between the input eccentric and the driven pawls at least one differential linkage means is provided, the result is obtained that the control electromagnets, which are advantageously provided for each linkage as a control means, do not have to move masses. The shifting of differential linkage means between the "stop" and the "go" condition is effected by the power of the input eccentric, and the control electromagnets mainly provide the power for holding the shifted control links in an arrested position, which requires little force.

For the energizing and deenergizing of the control magnets, no critical times have to be considered for practical purposes. For the starting or stopping of an operational cycle, 180° of one revolution of the input eccentric is available, and the times required for effecting energization or deenergization of the control electromagnets, is not added to the time required for the operational cycle. The energizing and deenergizing of the control electromagnets takes place in synchronism with the operation cycle. Consequently not only smaller electromagnets, but also simplified electronic control circuits can be used for the present invention, as compared with the prior art.

One embodiment of the invention is concerned with the transport of a driven means, such as a record carrier tape, only in one direction, and with momentarily starting and stopping the same. In this embodiment, an electromagnet attracts and arrests the control link of one of the linkages by which the drive member is reciprocated when stopping of the driven means is desired. When the respective control electromagnet is deenergized, the respective linkage is free to oscillate and transmits the oscillatory movement to the drive member which is reciprocated to stepwise move the driven means. The transport of the driven means requires the arresting or blocking of the respective other linkage, which is advantageously accomplished by a spring biassing the control link of the respective linkage into arresting abutment with a stop means. In such an arrangement, the stop means and the spring connected with the control link constitute a control means which is indirectly controlled by the control electromagnet which cooperates with the control link of the other linkage for arresting the same if the driven means is to be stopped.

In order to provide a small air gap at the control electromagnet by which a hammering noise is prevented, the stop means and the control electromagnet are mounted on a support in a particular relative position which can be adjusted.

In another embodiment of the invention, an intermediate input link is connected by a coupling pivot with the input member which is driven by an eccentric. The input pivot means is provided at the end of the intermediate input link, and operates the two linkages of the differential linkage means which are respectively controlled by two control electromagnets. Two drive pawls are mounted on the input pivot means and cooperate with ratchet wheels which have opposite teeth so that, depending on which linkage is arrested by a control electromagnet, the driven means is forward or rearward transported. The coupling pivot on the power input member, operates a third linkage which can be arrested by a third electromagnet so that the motion is transmitted by the coupling pivot to the intermediate input link. However, when the third electromagnet is deenergized, the third linkage idles, and no power can be transmitted to the drive pawls.

The third control electromagnet determines the "stop" and "go" position of the linkages, while the first and second control electromagnets determine whether the driven means is moved in a "forward" or "reverse" movement.

As explained above, the control links of the three linkages are attracted and released by the control electromagnets, but the force required for operating the drive pawls is derived exclusively from the eccentric driving the input member.

In another embodiment of the invention, two drive pawls cooperating with two opposite ratchet wheels are driven by the two linkages of a differential linkage controlled by first and second control electromagnets. The power is derived from an intermediate input link which carries the pivot means of the differential linkage. Another differential linkage is provided and includes third and fourth linkages controlled by third and fourth control electromagnets, and being driven by a power input member reciprocated by rotary eccentric. The intermediate input link is connected with the third linkage. Consequently, by selectively energizing the third or fourth control electromagnet, the differential linkage means either idles, or transmits motion to the intermediate input linkage. Depending on the selective energization or deenergization of the first and second control electromagnets, one or the other drive member is reciprocated to transport the driven means forward or rearward.

In the preferred construction of the present invention, the stationary pivots by which the control links of the linkages are supported for oscillation, are mounted on the yokes of the respective control electromagnets. All control electromagnets, or mechanical control means, respectively, are mounted in an adjusted relative position for obtaining proper air gaps of deenergized control electromagnets so that only a small force is required for arresting the respective linkage. The small air gaps reduced noise and wear to a minimum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a fragmentary elevation illustrating a second embodiment of the invention permitting selective forward and rearward movement, and stopping of a record carrier tape;

FIG. 3 is a fragmentary plan view, partially in section, illustrating the embodiment of FIG. 2, the electromagnets being omitted for the sake of clarity;

FIG. 4 is a fragmentary elevation illustrating a third embodiment of the invention permitting forward and rearward transport of a record carrier tape, and stopping of the same; and FIG. 5 is a fragmentary plan view of the embodiment of FIG. 4, the electromagnets being omitted for the sake of clarity.

DESCRIPTION OF THE PREFERRED EMBODIMENTS

Figure 1:
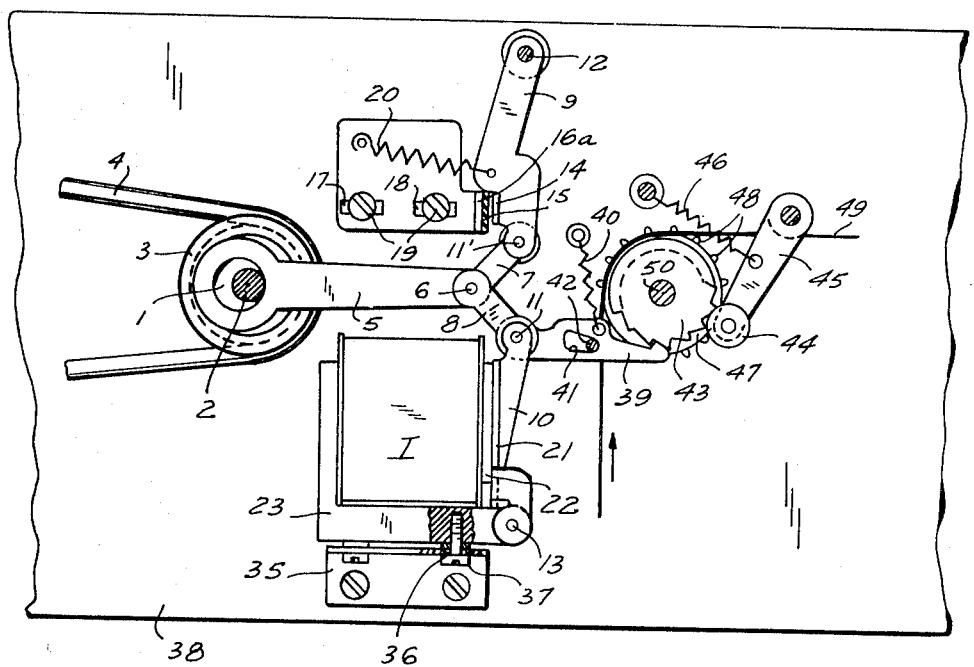
FIG. 1 is a fragmentary elevation illustrating a first embodiment of the invention permitting transport of a record carrier tape in one direction, and stopping and starting of the transport.

Referring now to FIG. 1, a drive shaft 2 carries a fixed eccentric circular member and a pulley 3 continuously driven by a belt 4. The eccentric 1 is rotatably mounted in a circular opening at one end of a power input means 5 whose other end carries a pivot 6 on which toggle links 7 and 8 are mounted for angular movement. The free ends of toggle links 7 and 8 are connected by pivots 11' and 11 with control links 9 and 10, respectively. A pivot 12 on the housing wall 38 supports the free end of control link 9 for angular movement, while control link 10 is connected by a pivot 13 to the magnetic yoke 23 of a stop control electromagnet I. The magnetic core 22 of electromagnet I is located opposite an armature 21 secured to control link 10. The magnetic yoke 23 is adjustably mounted on a supporting bracket 35 which is secured to housing wall 38. Slots 36 in a wall of bracket 35 receive screws 37 threaded into yoke 23 so that when the screws 37 are loosened, electromagnet I can be displaced to an adjusted position in relation to armature 21.

Control link 9 has a bent lug 14 forming an abutment cooperating with the stop 15 on a stop portion 16a of adjustable stop means 16 which has slots 17 through which screws 19 pass into threaded bores of housing wall 38. Upon loosening of screws 19, the gap between stop 15 and abutment 14 can be adjusted. A spring 20 connects control lever 9 with a fixed stud on stop means 16 and urges control lever 9 to move to a position in which abutment 14 abuts stop 15. The first linkage 7, 11', 9, 12 cooperates with first control means 16, 16a, and the second linkage 8, 11', 10, 13 cooperates with second control means I 21, 22. The first and second linkages are both connected by toggle levers 7 and 8 with the reciprocating pivot 6 and form together a differential linkage means which is operated by the input means 1, 2, 5, 6. A drive member 39 is mounted on pivot 11 and is biased by spring 40 secured to a stud on housing wall 30 to turn in counterclockwise direction to a position in which a pawl portion at the end thereof cooperates with a ratchet wheel 43 which is mounted on a shaft 50. Shaft 50 also carries a transporting sprocket 47 whose pins 48 project into openings in a record carrier tape 49 so that turning of ratchet 43 with transporting sprocket 47 causes movement of the record carrier tape 49 in the direction of the arrow.

Drive member 39 has an opening 41 of trapezoidal or wedge-shaped outline into which a pin 42 carried by housing wall 38 projects.

FIG. 1 illustrates eccentric 1 in a position in which input means 5 is retracted toward the lift so that drive member 39 is also retracted and pin 42 is located in the narrow end of opening 41. In this position, no angular movement of drive member 39 about pivot 11 is possible so that the engagement between the pawl portion of drive member 39 and the teeth of ratchet wheel 43 cannot be interrupted. An arresting means including a lever 45 mounted for angular movement on housing wall 38 and carrying a roller 44, is urged by spring 46 to turn to a position in which arresting roller 44 abuts a pair of teeth of ratchet wheel 43 for arresting ratchet wheel 43 and sprocket 47 when the pawl portion of drive member 39 releases the ratchet wheel.

When stop control electromagnet I is energized, armature 21 is attracted to abut magnet core 22 in the inoperative position shown in FIG. 1. Electromagnet I and stop means 16 are mounted on housing wall 38 in adjusted relative positions so that when armature 21 with control link 10 is held by electromagnet I, abutment 14 of control lever 9 is spaced a small air gap from stop 15 when eccentric 1 has retracted input means 5 to the position shown in FIG. 1.

When electromagnet I is deenergized, spring 20 can turn control lever 9 to a position in which abutment 14 abuts stop 15 while links 8 and 10 are angularly displaced so that even in the retracted position of input means 5, armature 21 is spaced a small air gap from magnet core 22.

During rotation of shaft 2 and eccentric 1, input means 5 reciprocates and the respective open air gap will be increased and again reduced. However, due to the fact that one of the air gaps is always opened, hammering of abutment 14 on stop 15, or of armature 21 on magnet core 22, and the resultant noise, are prevented. When it is not desired to transport the record carrier tape 49, stop control electromagnet I is energized and actuated, and blocks angular movement of control link 10 so that during the forward drive stroke of reciprocating means 5, links 7 and 9 are idly turned with abutment 14 moving farther away from stop 15. No motion is transmitted to drive member 39, and toggle link 8 turns idly about pivot 11. It is evident that electromagnet I has to produce only a small magnetic force during idling of the device since it holds armature 21 and core 22 without any air gap. The force transmitted from power input means 5 to toggle lever 8 is not taken up by the magnetic force of electromagnet I, but by pivot pin 13 and the stationary yoke 23.

When record carrier tape 49 is to be transported in the forward direction indicated by the arrow, stop control electromagnet I is deenergized, and the force of spring 20 is sufficient to turn control link 9 in clockwise direction until abutment 14 abuts stop 15 which causes angular displacement of toggle links 7 and 8, and of control link 10 so that a small air gap forms between armature 21 and magnet core 22, assuming that input means 5 is in the illustrated retracted position.

When input means 5 is driven by eccentric 1 in a forward drive stroke, the force transmitted by toggle link 7 to control lever 9 cannot angularly displace the same, but exerts a longitudinal pressure on control link 9 which cannot yield so that toggle link 8 is displaced and displaces through pivot 11 control link 10 which turns farther away from core 22 increasing the width of the air gap. This angular displacement of control lever 10 in clockwise direction, together with the displacement of toggle link 8 and pivot 11, causes a stroke of drive member 39 towards the right as viewed in the drawing. Since the wider portion of the slot 41 cooperates with pin 42 during forward movement of drive member 39, the backs of the teeth of ratchet wheel 47 can urge drive member 39 to turn slightly in clockwise direction while sliding over the back of the respective tooth. When the pawl portion of drive member 39 is located opposite the next notch of ratchet wheel 43, spring 40 pulls the pawl portion of drive member 39 into engagement with the notch. The wide end portion of the tapered slot 41 in drive member 39 permits the necessary angular displacement of drive member 39.

During the return stroke of input means 5 towards the left as viewed in the drawing, toggle levers 7 and 8 turn, and toggle lever 8 turns control lever 10 in counter-clockwise direction to a position in which a minimum air gap remains between armature 21 and core 22. The displacement of links 8 and 10 has displaced pivot 11 together with drive member 39 to the left as viewed in the drawing, so that ratchet wheel 43 is turned one step in clockwise direction, turning sprocket 47, and advancing record carrier tape 49 one step.

As long as stop control electromagnet I is deenergized, the reciprocating motion of input means 5 will result in stepwise angular movement of the rotary driven means 43, 47 and in stepwise movement of record carrier tape 49.

An inertia rotation of the rotary driven means 43, 47 beyond an angular step is prevented by the trapezoidal slot 41 since in the position shown in FIG. 1, pressure by the back of a ratchet tooth due to inertial rotation of rotary means 43, 47 cannot angularly displace drive member 39 to a position releasing ratchet wheel 43. Since pin 42 is the narrowest part of slot 41, no angular movement of drive member 39 away from the notch of the ratchet wheel 43 is possible.

During the forward stroke of drive member 39, when ratchet wheel 43 is momentarily disengaged from the drive member, arresting roller 44 prevents turning of the rotary driven means 43, 47 which may be caused by an extraneous force acting on record carrier tape 49.

When stop control electromagnet I is energized, armature 21 is attracted when drive member 39 and input means 5 are in the retracted positions and the air gap between armature 21 and core 22 is a minimum. Consequently, the drive member 39 is stopped in its retracted position in which ratchet wheel 43 is locked, as explained above, and no angular movement of the rotary driven means 47 for transporting the record carrier 49 can take place. As long as control electromagnet I is deenergized, control lever 10 with armature 21 continuously oscillates about pivot 13 toward and away from core 22, and due to this oscillation, the air gap between the armature 21 and the core 22 is alternately increased and reduced. When the air gap is a minimum in the retracted position of drive member 39, a very small magnetic force is required for attracting and holding armature 21, so that the movement of the driven means 47 and 49 is reliably stopped within have a revolution of drive shaft 2. Control electromagnet I and the mechanical control means 14 to 20 are arresting means for arresting the first and second linkages, respectively, which form the differential linkage means 6 to 13. By deenergizing control electromagnet I, stepwise angular movement of the rotary driven means 47 and stepwise transport of the record carrier tape 49 are obtained, while the rotary driven means 47 and the record carrier tape 49 are stopped when control electromagnet I is energized.

Referring now to FIGS. 2 and 3, this embodiment is provided with three electromagnets II, III, and IV which effect forward and rearward movement of the rotary driven means transporting a record carrier tape, and also stopping of the same.

Drive shaft 52 carries an eccentric 51 by which an input means 55 is reciprocated. A pivot 56 at the free end of input means 55 supports two toggle links 57 and 68 for angular movement. A pivot 58 connects toggle link 57 with a control lever 59 mounted for pivotal movement on a pivot 60 on the yoke 63 of a control electromagnet II. An armature 61 is secured to control link 59 and cooperates with the magnet core 62 of control electromagnet II. Yoke 63 is secured to a supporting bracket 64 by screws, and bracket 64 is adjustably mounted on housing wall 67 and has slots 65 through which screws 66 pass into threaded bores of housing wall 67.

Toggle link 68 serves as an intermediate input link and has at its free end the pivot 69 on which two toggle levers 70 and 71 are mounted for angular movement. A pivot 72 connects toggle link 70 with a control lever 73, and a pivot 72 connects toggle link 71 with a control lever 80.

Control lever 73 is mounted on a pivot 74 on the yoke 76 of a control electromagnet III whose core 76 cooperates with the armature 75 secured to control lever 73. Yoke 76 is adjustably secured to a bracket 78 by adjusting screws 79 in slots of bracket 78 which is secured to housing wall 67.

A control lever 80 is mounted for angular movement on a pivot 81 on yoke 84 of a control electromagnet IV whose core 83 cooperates with the armature 82 which is secured to control link 80. Yoke 84 is secured to a bracket 85 by screws 86 passing through slots 87. Bracket 85 is secured to the housing wall 67.

Pivot 69 of the differential linkage 68, 70, 71, 73, 80 also supports two drive members 88 and 89 for angular movement. The ends of drive members 88 and 89 have slots into which the bent-over ends of a semicircular leaf spring 90 are inserted which urges pawl portions at the ends of drive members 88 and 89 into engagement with two ratchet wheels 91 and 92 which are secured to a sprocket 93 provided with pins 94 adapted to engage openings in a record carrier tape, not shown, for transporting the same, as described with reference to FIG. 1.

Between drive members 88 and 89, a curved abutment 96 is provided on which drive members 88 and 89 abut due to the action of leaf spring 90. Abutment 96 has a curved slide face on which drive members 88 and 89 slide when pivot 69 is displaced.

The teeth of ratchet wheels 91 and 92 are oriented in opposite direction so that reciprocation of drive member 88 will cause the driven means 93 to rotate in counter-clockwise direction, while the reciprocation of drive member 89 will cause the driven means 93 to rotate in clockwise direction.

During operation of the device, drive shaft 52 rotates continuously with eccentric 51, and input means 55 reciprocates and oscillates. FIG. 2 illustrates an inoperative position in which the differential linkages idle and the rotary driven means 93 is stopped. In this position, the control electromagnets III and IV are energized, and the control electromagnet II is deenergized. Electromagnets II, III and IV are adjusted so that when armatures 75 and 82 of the energized electromagnets III and IV abut magnet cores 76 and 83, respectively, of the energized electromagnets III and IV, a small air gap is opened between armature 61 and magnet core 62 of the deenergized electromagnet II. Consequently, armature 61 oscillates with control link 59 about pivot 60 without hammering onto the magnet core 62 so that no noise is produced and excessive wear of the parts is prevented. The position of FIG. 2 in which electromagnets III and IV are energized, and electromagnet II is deenergized, may be referred to as "stop" position since rotary driven means 93 is stopped due to the fact that control levers 73 and 80 with armatures 75 and 82 are attracted by the energized electromagnets III and IV to abut cores 76 and 83 so that the differential transmission 68 to 74 and 80 to 81 is blocked and prevents movement of the drive members 88 and 89. In addition to the "stop" position, the apparatus has a "forward" position in which rotary driven means 93 turns in clockwise direction, and a "reverse" position in which rotary driven means 93 turns in counter-clockwise direction.

For obtaining the "forward" position of the apparatus, control electromagnet IV is deenergized, and control electromagnet II is energized during movement of control lever 59 with armature 61 toward magnet core 62. When the air gap is a minimum, armature 61 is attracted to abut magnet core 62 so that control lever 59 can no longer angularly oscillate about pivot 60, and toggle link 57 oscillates about pivot 58 so that the reciprocating movement of input means 55 is transmitted by pivot 56 to the intermediate input link 68 and to pivot 69. During the above-described "stop" position, intermediate input link 68 angularly oscillates about the blocked pivot 69. Since in the position "forward" toggle link 57 turns about pivot 58, pivot 56 moves along a circular path, and intermediate input link 68 is longitudinally reciprocated with pivot 69.

Since electromagnet III is now energized and prevents oscillation of control link 73, the motion is transmitted from pivot 69 to toggle link 71 and to control link 80 which is oscillated about pivot 81 to form a gap of varying width between armature 82 and magnet core 83 of the deenergized electromagnet IV.

Reciprocation of pivot 69 causes reciprocation of drive member 89 so that the pawl portion of the same slides during the forward stroke over the backs of the teeth of ratchet wheel 92 and then falls into a notch to turn ratchet wheel 92 in clockwise direction during the return stroke. The spring 90 assures a reliable engagement between the pawl portion of drive member 89 and the notches of ratchet wheel 92. When ratchet wheel 92 is stepwise rotated in clockwise direction during continued reciprocation of input means 55, a driven rotary means 93 moves a record carrier tape in forward direction.

During the stroke of intermediate input link 68 and pivot 69 to the right as viewed in the drawing, toggle link 70 turns about pivot 72 so that drive member 88 turns about the abutment 96 and its pawl portion is moved out of the respective notch of ratchet wheel 91 against the action of spring 90, so that ratchet wheel 91 can turn in clockwise direction with ratchet wheel 92.

During the return stroke of intermediate input link 68 to the left as viewed in the drawing, drive member 89 turns ratchet wheel 92 one step, and after this step, pivot 69 is in such a position that spring 90 can move drive member 88 to a position engaging the next following notch of ratchet wheel 91 without being blocked by abutment 96. Due to the simultaneous engagement of ratchet wheels 91 and 92 by drive members 88 and 89, inertia movements of the ratchet wheels, and recoil movement of sprocket 93 are prevented.

If th record carrier tape is to be moved in the opposite direction in the position "reverse" of the apparatus, control electromagnets II and IV are energized during a return stroke of intermediate input link 68 to the left so that during the following forward stroke of link 68, motion is transmitted by pivot 69 to links 70 and 73 so that a armature 75 moves away from the magnetic core 76 of the deenergized electromagnet III, and forms a small air gap with the same.

During reciprocation of intermediate input link 68, pivot 69 moves along a circular path whose center is in blocked pivot 72 so that drive member 88 is reciprocated and cooperates with ratchet wheel 91 to turn the same in counter-clockwise direction so that the direction of movement of the record carrier tape transported by sprocket 93 is reversed. The forward movement of pivot 69 also effects turning of the drive member 89 about abutment 96 so that the pawl portion thereof is lifted out of the respective notch of ratchet wheel 92 so that drive member 88 can turn the ratchet wheel.

The gap between armature 75 and magnet core 76 remaining at the end of the return stroke of intermediate input link 68 prevents hammering noise and reduces wear.

By positioning the control electromagnets II, III and IV in relation to the differential linkages in such a manner that there is always one air gap open while the other two air gaps are closed, the result is obtained that the control electromagnets do not have to move mechanical pawls by great magnetic force, and that the only magnetic force required need only be sufficient to hold the armatures on the cores, respectively. This arrangement results in a substantial increase of the operating speed as compared with other stepping transporting mechanisms. Furthermore, the electronic program control can be obtained by simple and less expensive apparatus than in electromagnetically controlled transporting apparatus according to the prior art since the electric control pulses do not have to arrive at the electromagnets at an exactly determined moment, since the entire stroke of the respective control link provides the time period during which a control pulse must arrive, which corresponds to the time period required for the return stroke of the intermediate input link 68, and to a turning of eccentric 51 an angle of 180°. All power required for mechanical movement, is derived from eccentric 51, and not from the control electromagnets.

While in the embodiments of FIGS. 2 and 3, a differential linkage and a toggle linkage are combined to form two differential linkages, the embodiments of FIGS. 4 and 5 have two successive differential linkages controlled by four electromagnets V, VI, VII and VIII to obtain "stop," "forward," and "reverse" positions of the apparatus.

A drive shaft 102 carries an eccentric 101 which reciprocates an input means 105 connected by a pivot 106 to a pair of toggle links 107 and 108 which are connected by pivots 109 with control levers 110 and 118 which are mounted for pivotal movement on pivot pins 111, 119 secured to yokes 114 and 122 of two electromagnets V and VI, respectively. Electromagnets V and VI have magnet cores 113 and 121 cooperating with armatures 112 and 120 secured to control levers 110 and 118, respectively. Electromagnet V is secured by adjusting screws 116 passing through slots, not shown, in a supporting bracket 115 secured to housing wall 117. Electromagnet VI is adjustably secured by screws 124 passing through slots 125 in a supporting bracket 123 mounted on housing wall 117.

Pivot 109 between toggle link 108 and control link 118 also supports an intermediate input link 126 for angular movement. A coupling pivot 127 on link 126 is connected with toggle links 128 and 129 which are respectively connected with pivots 130 to control links 131 and 138. Control link 131 carries an armature 133 cooperating with a magnet core 134 of control electromagnet VII. Control link 131 is mounted on a stationary pivot 132 on yoke 135 which is secured by screws 137 to a support bracket 136. Slots, not shown, in a wall bracket 136 permit adjustment of the position of electromagnet VII.

Control link 138 carries an armature 140 cooperating with a magnet core 141 of electromagnet VIII whose yoke carries a pivot 139 on which control link 138 is mounted for angular movement.

Adjustable screws 144 pass through slot 145 in a wall of a support bracket 143 and into yoke 142 so that the position of electromagnet VIII can be adjusted. Support bracket 143 is also secured to housing wall 117.

Pivot 130 between toggle link 129 and control link 138, also supports a drive member 147 whose pawl portion cooperates with a ratchet wheel 150. Pivot 130 between toggle link 128 and control link 131 supports another drive member 146 whose pawl portion cooperates with teeth of another ratchet wheel 148, the teeth of the two ratchet wheels being oppositely oriented so that reciprocation of the drive members causes turning of shaft 160 with a sprocket wheel 166, as best seen in FIG. 5.

A shiftable lever 168 is mounted on a pivot 162 and has two stops 163 and 164 on which drive members 146 and 147 abut under the action of a spring 148. Shifting lever 168 has an open slot 165 embracing coupling pivot 128 laterally of toggle link 129, as best seen in FIG. 5.

The position of control electromagnets VI, VII and VIII is adjusted so that when the respective armatures are attracted by the energized electromagnets VI, VII and VIII, and abut the respective magnet cores, a small air gap remains between the core 113 of electromagnet V and its armature 112 on control link 110. In this "stop" position, the reciprocating motion of input means 105 is not transferred to the intermediate input link 126, but toggle link 107 oscillates idly with control link 110 while control link 118 is blocked.

When control electromagnet VI is deenergized, and control electromagnet V is energized, a condition "go" is obtained in which power is transmitted from input means 105 and pivot 106 to toggle link 108 and intermediate input link 126. Due to the kinetic energy of the returning links, and the closing of the air gap between armature 112 and magnet core 113, a small air gap is opened between armature 120 and magnet core 121 of electromagnet VI, and control link 118 can oscillate with toggle link 108 and intermediate input link 126. An idling of the stepping mechanism can also be obtained by energizing only electromagnet VI which also results in abutment of armatures 133 and 140 on magnet cores 134 and 141, respectively, while the differential linkage 128, 129, 131, 138 is at a standstill. During rotation of drive shaft 102 only control lever 110 oscillates about pivot 111. The air gap between armature 112 and magnet core 113 prevent hammering noises.

For obtaining the condition "go" and "forward," electromagnet VII must be energized together with electromagnet V, and electromagnets VI and VII must be deenergized. During the following drive stroke of input means 105, toggle link 107 turns about pivot 109, and motion is transmitted through toggle link 108, pivot 109, and intermediate input link 126 to toggle link 129 and control lever 138 which turns about pivot 139 so that the displacement of pivot 130 effects a reciprocation of drive member 147 which engages the next following notch due to the action of spring 148 and then turns ratchet wheel 150 with driven shaft 160 in clockwise direction to turn the sprocket one step for moving the record carrier tape one step in forward direction.

At the same time, coupling pivot 127 turns shifting lever 168 in counterclockwise direction so that stud 163 pushes drive member 146 out of the respective notch of ratchet wheel 149 so that rotation of driven shaft 160 in clockwise direction is not blocked.

During the return stroke, drive member 147 turns ratchet wheel 151 one step in clockwise direction while coupling pivot 127 moves in clockwise direction with toggle link 128 so that shifting lever 168 is turned in clockwise direction about pivot 162 and permits spring 148 to pull drive member 146 back into the next following notch of ratchet wheel 149. The interaction of the drive members 146 and 147 prevents uncontrolled inertia movements of ratchet wheels and of the rotary means driven by the same.

If it is desired to reverse the direction of movement of the record carrier tape, command signals "go" and "reverse" are given and electromagnets V and VIII are energized during a return stroke of input means 105. Electromagnets VII and VI are deenergized.

In this condition, motion is transmitted from shaft 102 and eccentric 101 to intermediate input link 126 in accordance with the command signal "go," and then to links 128 and 131 which operate drive member 146. Since armature 140 of control lever 138 is attracted by the energized electromagnet VIII, control link 131 oscillates about pivot 132, and drive member 146 is reciprocated to stepwise turn ratchet wheel 149 so that the driven means including shaft 160 and the sprocket transporting the record carrier tape, not shown, are rotated in counterclockwise direction, corresponding to a rearward motion of the record carrier tape.

Shifting lever 146 is angularly displaced by coupling pivot 127 to push the blocked drive member 147 out of the notch of ratchet wheel 150 so that counterclockwise rotation of the rotary driven means is not blocked, and ratchet wheel 149 can make a transporting step at the end of which coupling pivot 127 is in a displaced position in which shifting lever 168 is turned to permit spring 148 to return drive member 147 to the blocking position engaging the next following notch. This cooperation between the two drive members prevents irregular inertia or recoil movements of the driven rotary means.

In the embodiment of FIGS. 2 and 3, and in the embodiment of FIGS. 4 and 5, one of each pair of electromagnets cooperating with a differential linkage, can be replaced by a mechanical control means including a spring and a stop means, as explained with reference to the stop means 16, spring 20, and control link 9 of the embodiment of FIG. 1.

The two control electromagnets of a differential linkage, for example electromagnets V and VI, or electromagnets VII and VIII, can be electrically connected by a flip-flop circuit.

The input means 5, 55, or 105, and the intermediate input links 68 or 126, which transmit motion to the respective differential linkages, are also part of the differential linkages. The input means 105 of FIG. 4, for example, may be compared with the input gear of the differential gear transmission of a motor car. The transmission of motion to different differential linkages is effected by eccentric 101 and pivot 109, comparable to the function of the cardan shaft of the motor car.

The differential stepping mechanism of the invention has been described in combination with the stepwise rotation of the rotary driven means in the form of a sprocket for stepwise transporting a record carrier tape. However, the rotary driven means can be used for other purposes, for example for stepwise moving registers or counters in which event instead of sprockets 47 or 93, a gear is driven in steps by the ratchet wheels, and meshes with another gear of the device which is to be stepwise shifted.

It will be understood that each of the elements described above, or two or more together, may also find a useful application in other types of stepping mechanisms differing from the types described above.

While the invention has been illustrated and described as embodied in a differential stepping mechanism comprising electromagnets and differential linkages controlling the transmission of power to reciprocating drive means by which a rotary means is driven in steps in forward or rearward directions, it is not intended to be limited to the details shown, since various modifications and structural changes may be made without departing in any way from the spirit of the present invention.

What is claimed as new and desired to be protected by Letters Patent is set forth in the appended claims:

1. Differential stepping mechanism, comprising, in combination, input means including a reciprocable pivot means; differential linkage means including first and second linkages, each linkage including a toggle link mounted on said pivot means, a control link, a connecting pivot for connecting said toggle links with said control link, and a stationary pivot supporting said control link for angular movement; first and second control means cooperating with said first and second linkages, respectively, for arresting a selected one of the same so that the respective other linkage oscillates, at least one of said first and second control means including an electromagnet; drive means connected with said first linkage and being reciprocated by the same when said second linkage is arrested and said first linkage oscillates; and driven means stepwise driven by said drive means when said second linkage is arrested.

2. Stepping mechanism as claimed in claim 1 wherein said first control means includes said electromagnet which cooperates with said control link of said first linkage for arresting the same; and wherein said drive means include a drive member mounted on said connecting pivot of said first linkage.

3. Stepping mechanism as claimed in claim 2 wherein said second control means includes an adjustable stop means and a spring biassing said control link or said second linkage to abut said stop means so that said second linkage is arrested when said electromagnet is deenergized and said differential linkage means are moved by said spring to a position in which said control link of said second linkage abuts said stop means and is arrested.

4. Stepping mechanism as claimed in claim 1 wherein said driven means includes a rotary ratchet wheel; and wherein said drive means includes a reciprocable drive pawl cooperating with said ratchet wheel for stepwise turning the same, said drive pawl having a tapered wedge opening having a narrow end; and comprising a stationary stud projecting into said opening and blocking angular movement of said drive pawl when located at said narrow end of said tapered opening.

5. Stepping mechanism as claimed in claim 1 wherein said power input means includes a drive shaft, an eccentric on said drive shaft, an input arm having one end mounted on said eccentric, and supporting said pivot means at the other end thereof so that the same reciprocates during rotation of said drive shaft with said eccentric.

6. Stepping mechanism as claimed in claim 1 wherein said first control means includes said electromagnet, wherein said electromagnet includes an armature fixed to said control link of said first linkage, and a magnet core for attracting said armature with said control link whereby said first linkage is arrested when said electromagnet is energized and said armature abuts said magnet core.

7. Stepping mechanism as claimed in claim 6 wherein said second control means includes a stop means and a spring biasing said control link of said second linkage into abutment with said stop means for arresting said second linkage; comprising supporting means for supporting said stop means and said electromagnet in a relative position in which, when said electromagnet is energized and said armature abuts said magnet core, said control link of said second linkage is spaced a small air gap from said stop means, and in which position said armature forms a small air gap with said magnet core when said electromagnet is deenergized and said control link of said second linkage abuts said stop means under the action of said spring.

8. Stepping mechanism as claimed in claim 7, including adjusting means for adjusting the positions of said stop means of said electromagnet on said supporting means.

9. Stepping mechanism as claimed in claim 1, wherein said electromagnet includes a yoke; and wherein said stationary pivot of said first linkage is mounted on said yoke for supporting said armature with said control link of said first linkage for oscillating movement when said electromagnetic means is deenergized.

10. Stepping mechanism as claimed in claim 1, wherein said input means includes a reciprocating input member, a coupling pivot on said input member, and an intermediate input link mounted on said coupling pivot; wherein said reciprocating pivot means is carried and reciprocated by said intermediate input link; wherein said drive means includes first and second drive members for driving said driven means in forward and reversed directions and being mounted on said reciprocating pivot means for angular movement and for reciprocating movement therewith; wherein said differential linkage means include a third linkage including a toggle link mounted on said coupling pivot; and comprising third control means cooperating with said third linkage for selectively arresting and releasing the same.

11. Stepping mechanism as claimed in claim 10, wherein said third linkage includes a control link, a connecting pivot connecting said toggle link with said control link; and wherein said third control means cooperates with said control link of said third linkage for arresting and releasing the same.

12. Stepping mechanism as claimed in claim 11, wherein said first, second, and third control means are first, second, and third electromagnets, respectively, each electromagnet having an armature secured to said control link of said first, second, and third linkages, respectively, so that no power is transmitted from said input member to said intermediate input link when said third electormagnet is deenergized, and so that said driven means is moved by said first and second drive members in opposite directions when one of said first and second electromagnets is energized and the respective other electromagnet is deenergized, respectively, while said third electromagnet is energized.

13. Stepping mechanism as claimed in claim 12, wherein said driven means include first and second ratchet wheels having opposite teeth; wherein said first and second drive members include first and second drive pawls cooperating with said first and second ratchet wheels, respectively, and located on opposite sides of the same; and wherein said drive means include an arcuate leaf spring abutting said first and second drive pawls for urging the same into engagement with said first and second ratchet wheels, respectively.

14. Stepping mechanism as claimed in claim 12, wherein said driven means include first and second ratchet wheels having opposite teeth; wherein said first and second drive members include first and second drive pawls cooperating with said first and second ratchet wheels, respectively, and located on opposite sides of the same; wherein said drive means include an abutment between said first and second drive pawls and having slide faces for the same so that the drive pawl which does not reciprocate, tilts about said slide face to a position releasing the respective ratchet wheel during turning of the same with the other ratchet wheel.

15. Stepping mechanism as claimed in claim 12, wherein said driven means include first and second ratchet wheels having opposite teeth; wherein said first and second drive members include first and second drive pawls cooperating with said first and second ratchet wheels, respectively, and located on opposite sides of the same; wherein said driven means includes shaft fixedly carrying said ratchet wheels, and a sprocket fixed on said shaft for transporting a record carrier tape.

16. Stepping mechanism as claimed in claim 12, wherein each electromagnet has an abutment for said armature thereof; and comprising supporting means for supporting said first, second, and third electromagnets in a relative position in which said armature of at least one of said electromagnets forms an air gap with the respective abutment when the respective electromagnet is deenergized and the respective other electromagnets are energized and have the armatures thereof abutting said abutments thereof; and adjusting means for adjusting the posions of said first, second, and third electromagnets on said supporting means for placing said electromagnets in said relative position.

17. Stepping mechanism as claimed in claim 1, wherein said input means include an intermediate input link carrying said pivot means; wherein said drive means include first and second drive members for driving said driven means in forward and reversed directions, respectively, and mounted on said connecting pivots of said first and second linkages for angular movement and for reciprocating movement therewith; and comprising power input means including an input member and an other pivot means on said input member; an other differential linkage means including third and fourth linkages, each of said third and fourth linkages including a toggle link mounted on said other reciprocating pivot means, a control link, a connecting pivot for connecting said toggle link with said control link, and a stationary pivot supporting said control link for angular movement, said intermediate input link being mounted on the connecting pivot of said third linkage; third and fourth control means cooperating with said third and fourth linkages for arresting a selected one of the same so that the respective other linkage oscillates, at least one of said third and fourth control means including an electromagnet whereby said intermediate input link and said pivot means thereof are selectively reciprocated or not reciprocated.

18. Stepping mechanism as claimed in claim 17, wherein said first, second, third and fourth control means, respectively, include first, second, third and fourth electromagnets selectively energizable for arresting the respective correlated linkages for stopping said driven means and for driving the same forward or rearward by said drive members, respectively.

19. Stepping mechanism as claimed in claim 17, wherein said driven means include coaxial first and second ratchet wheels having opposite teeth and being connected for rotation; wherein said first and second drive members include pawls cooperating with said first and second ratchet wheels, respectively, and located on opposite sides thereof, said drive means including a spring connecting said drive members and urging said pawls into said engagement with said ratchet wheels, and a shifting member between said first and second drive members and having studs against which said drive members abut under the action of said spring.

20. Stepping mechanism as claimed in claim 19, wherein said drive means include a pivot for mounting said shifting member for angular movement; and wherein said shifting member has a slot embracing said pivot means of said intermediate input link.

21. Stepping mechanism as claimed in claim 17, wherein said power input means includes a rotary driven eccentric; and wherein said input member has an opening receiving said eccentric and is driven by the same; wherein both said third and fourth control means include electromagnetic means having yokes; wherein said stationary pivots of said third and fourth linkages are mounted on said yokes, respectively, and means for adjusting the relative position of said yokes.

22. Stepping mechanism as claimed in claim 17, wherein said first, second, third and fourth control means respectively include first, second, third and fourth electromagnets selectively energizable for arresting the respective correlated linkages for stopping said driven means and for driving the same forward or rearward by said drive members, respectively; and comprising means for simultaneously energizing one and deenergizing the other of said third and fourth electromagnets, and for simultaneously energizing one and for deenergizing the other of said first and second electromagnets while said fourth electromagnet is energized.

References Cited

UNITED STATES PATENTS

| | | | |
|---|---|---|---|
| 2,177,088 | 10/1939 | Albertoli | 74—520 |
| 2,369,362 | 2/1945 | Marziani | 74—520 |
| 3,452,623 | 7/1969 | Bastian | 74—520 |

FOREIGN PATENTS

| | | |
|---|---|---|
| 370,191 | 2/1923 | Germany. |
| 683,665 | 12/1952 | Great Britain. |

WESLEY S. RATLIFF, Jr., Primary Examiner

U.S. Cl. X.R.

74—520